(12) United States Patent
Gombert et al.

(10) Patent No.: US 6,844,037 B2
(45) Date of Patent: Jan. 18, 2005

(54) FUEL TANK COMPRISING BLOWN VESSEL AND OVERMOLDED INSERT

(75) Inventors: Patrice Gombert, Compiegne (FR); Stéphanie Marchal, Margny les Compiegne (FR); Alain Gris, Saint Sauveur (FR); Claude Leviel, Duvy (FR); Philippe Griaud, Compiegne (FR)

(73) Assignee: Compagnie Plastic Omnium, Lyons (FR)

(*) Notice: Subject to any disclaimer, the term of this patent is extended or adjusted under 35 U.S.C. 154(b) by 72 days.

(21) Appl. No.: 10/340,610

(22) Filed: Jan. 13, 2003

(65) Prior Publication Data

US 2003/0099795 A1 May 29, 2003

Related U.S. Application Data

(63) Continuation of application No. 09/709,723, filed on Nov. 13, 2000, now Pat. No. 6,527,892.

(30) Foreign Application Priority Data

Nov. 12, 1999 (FR) .............................................. 99 14224

(51) Int. Cl.$^7$ ................................................. B29C 49/20
(52) U.S. Cl. ..................... 428/35.7; 156/156; 264/138; 264/516
(58) Field of Search ............................... 428/35.7, 36.6, 428/36.7, 500, 516; 156/156; 264/138, 516

(56) References Cited

U.S. PATENT DOCUMENTS

| 4,323,411 A | 4/1982 | Uhlig |
| 6,391,408 B1 * | 5/2002 | Hutchinson ................ 428/35.7 |
| 6,527,892 B1 * | 3/2003 | Gombert et al. ............ 156/156 |

FOREIGN PATENT DOCUMENTS

| DE | 42 05 332 A1 | 8/1993 |
| DE | 4337491 A1 | 5/1995 |
| DE | WO 95/12484 | 5/1995 |
| JP | A 6-47801 | 2/1994 |
| JP | A 8-192457 | 7/1996 |

* cited by examiner

Primary Examiner—Sandra M. Nolan
(74) Attorney, Agent, or Firm—Oliff & Berridge, PLC

(57) ABSTRACT

A fuel tank includes a vessel having a wall, the wall includes at least a first layer forming a hydrocarbon barrier, and a second layer that is more permeable to hydrocarbons than the first layer and is located on an outside of the first layer. The fuel tank also includes an insert defining a passage between an inside of the vessel and an outside thereof. The insert includes a first end overmolded by the wall and a second end opposite to the first end projecting outside the vessel. The wall has a portion extending inside the insert around an opening of the wall, the insert being configured to form at least one region of reduced thickness in the second layer along a diffusion path for hydrocarbons diffusing along the second layer from an edge of the wall adjacent to the opening towards the outside of the vessel.

30 Claims, 3 Drawing Sheets

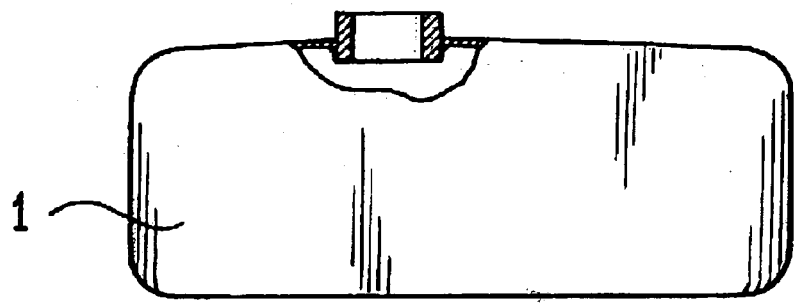
FIG_1
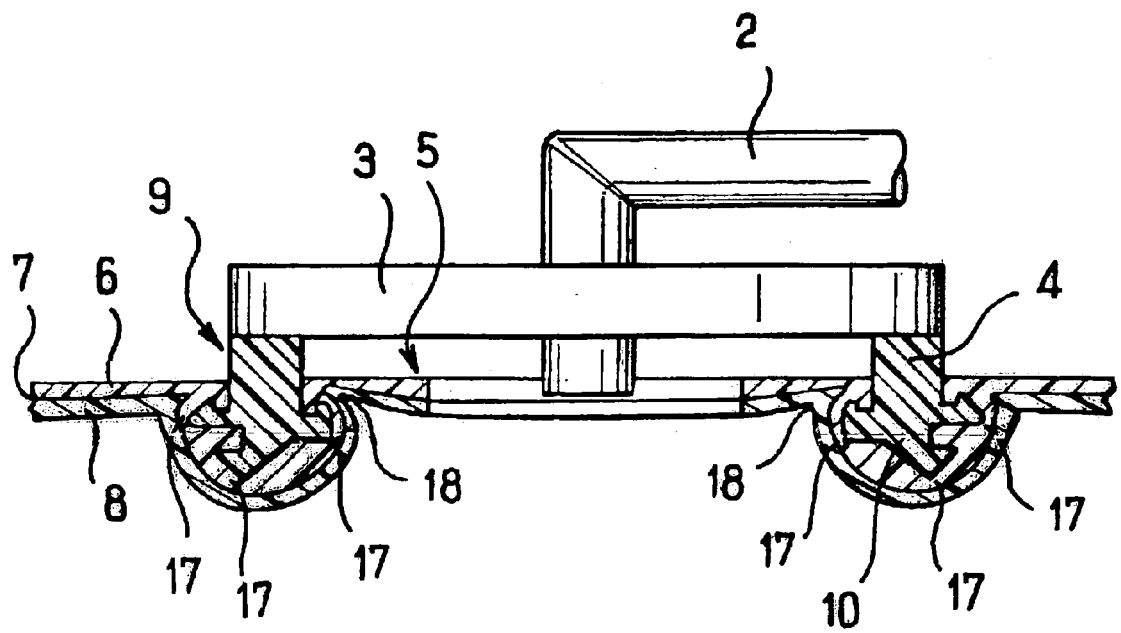
FIG_2

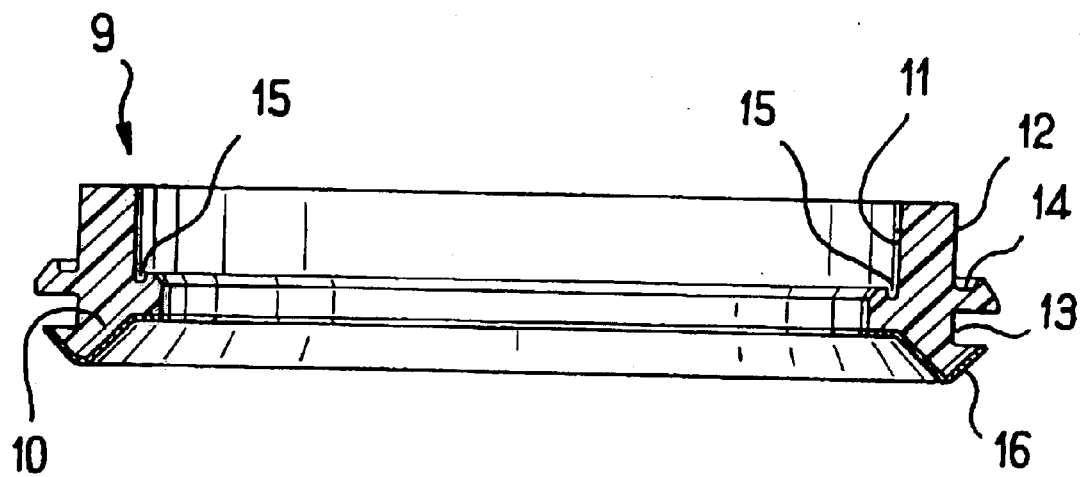
FIG_3
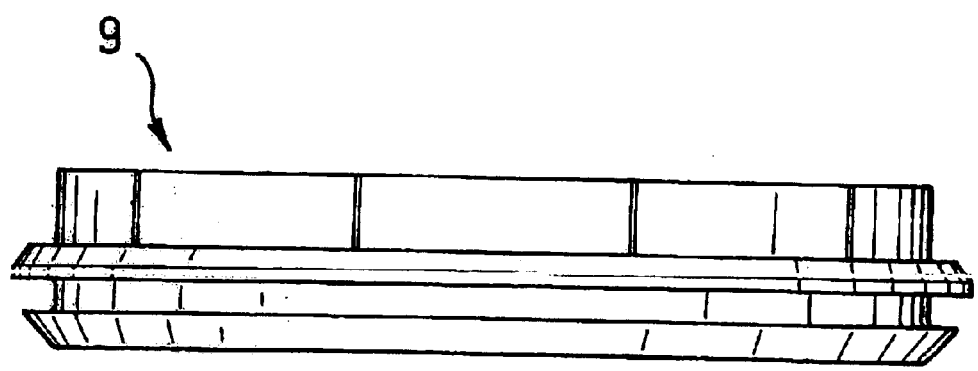
FIG_4

FUEL TANK COMPRISING BLOWN VESSEL AND OVERMOLDED INSERT

This is a Continuation of application Ser. No. 09/709,723 filed Nov. 13, 2000 now U.S. Pat. No. 6,527,892

The present invention relates to a method of making a blown vessel provided with a mouth, to an insert for being overmolded by blowing a parison, and to a blown vessel including such an overmolded insert.

The present invention relates more particularly to the field of fuel tanks made in the form of blown vessels of plastics material.

BACKGROUND OF THE INVENTION

A fuel tank made of plastics material is provided with a hydrocarbon barrier which prevents or limits hydrocarbon emissions through its wall, e.g. in the form of leaks or by diffusion.

Known barriers are obtained by fluorination methods or they are constituted by a layer of ethylene vinyl alcohol copolymer (EVOH) inserted between two layers of polyethylene.

Vessels made in this way generally give satisfaction in terms of the hydrocarbon emission criterion.

Nevertheless, they require various arrangements, in particular to enable them to be connected to ducts, e.g. for delivering or receiving liquid fuel, and also for allowing gas to flow in the fuel system.

It is therefore necessary for such vessels to be pierced in order to put ducts into communication with the inside thereof and to make assemblies by screwing, heat-sealing, snap-fastening, or other means in order to secure said ducts to the wall of the vessel.

Such piercing and assembly operations give rise to passages through the hydrocarbon barriers and they thus make hydrocarbon emissions possible.

French patent FR 2 459 121 describes a hollow body made by blowing, e.g. a motor vehicle tank, the hollow body including a piece of metal held captive in its wall, the captive piece having perforations into which a single layer material forming the hollow body penetrates while it is being blown, the captive piece being designed to co-operate with a stopper element.

The captive piece is thus retained very strongly in the wall of the hollow body.

German patent application DE-A-4 205 332 describes assembling a metal coupling element to a fuel tank made by blowing a single layer of material, in which the parison for forming the tank partially covers said coupling element.

Such an assembly serves to limit hydrocarbon emissions to some extent.

OBJECTS AND SUMMARY OF THE INVENTION

The present invention seeks to limit hydrocarbon emissions more effectively, or indeed to eliminate them.

The invention provides firstly a method of making a blown vessel provided with a passage suitable for putting the inside of the vessel into communication with the outside thereof and including a mouth on the outside, said method comprising the following steps:

overmolding an insert of tubular shape in a parison while it is being blown so that the parison covers one of the ends of the insert, while leaving the opposite end of the insert projecting outside the vessel so as to constitute the outside mouth of the passage, the vessel made from the parison having at least a first layer forming a hydrocarbon barrier and a second layer that is more permeable to hydrocarbons than the first and that is outside it; and then eliminating at least a portion of the wall lying inside the insert, the insert being shaped to lengthen the diffusion path for hydrocarbons diffusing along the second layer from the edge of the vessel adjacent to the removed wall portion towards the outside of the vessel, and/or to form one or more regions of reduced thickness in said second layer along the diffusion path.

Since the vessel and the insert are secured to each other while the parison is being blown, the connection between them takes place without any interruption in the continuity of the wall of the vessel.

The second layer which is more permeable to hydrocarbons forms a preferred passage towards the outside for hydrocarbons. The reductions in the thickness of this second layer on the diffusion path and/or the lengthening of this path constitute corresponding obstacles to diffusion and make it possible to limit hydrocarbon emissions effectively.

The second layer may present a single region of reduced thickness, however it preferably presents at least two regions of reduced thickness, and better still three such regions.

The barrier-forming first layer can be in the form of an EVOH barrier layer and it can be disposed, for example, between inner and outer layers of the vessel, said barrier being neither cut nor pierced at the moment the insert is put into place.

The same applies to any other hydrocarbon barrier obtained, for example, by fluorination or by coating.

The sole disturbance to which the wall of the vessel is subject is deformation enabling it to fit closely around the shape of the end of the insert which it covers, which deformation is favorable to establishing a more effective barrier to hydrocarbons at the junction between the vessel and the insert because the barrier-forming layer which has been stretched by the deformation, presses more intimately against or comes very close to the insert, thus reducing the size of the gap available between the insert and said barrier for the passage of hydrocarbons.

The vessel can include at least one layer of polyethylene.

In a particular implementation of the invention, an insert is used that is made of a material that is poorly permeable to hydrocarbons, which material is referred to in the description below as a "low permeability material".

In yet another particular implementation of the invention, an adhesive is interposed between the parison and the end of the insert covered by said parison, thereby improving contact between the end of the insert covered by the wall and said wall, by providing adhesion.

The adhesive can be deposited on a localized area of the parison before the insert is overmolded, or on at least a portion of the end of the insert itself.

In a particular implementation of the invention, one or more peripheral grooves are formed in the end of the insert that is covered by the parison, with the parison penetrating into the grooves at the moment overmolding occurs during blowing. These grooves serve in particular to retain the insert mechanically on the wall of the vessel.

The peripheral groove(s) can include an inner groove opening out into the inside space of the insert.

In a particular variant of this implementation, the peripheral grooves comprise an outer first groove whose opening is directed towards the outside of the insert, an outer second groove whose opening faces along the axis of the insert towards the outside of the vessel, and an inner third groove whose opening faces along the axis of the insert towards the outside of the vessel.

Each of these grooves perform two functions, both mechanical connection between the insert and the wall of the vessel, and deformation of the vessel so as to constitute baffles on the path of any hydrocarbon getting round the insert to escape from the vessel.

The insert can be shaped in such a manner that the vessel has a reentrant corner situated in the inside space of the insert.

The external mouth formed by the insert can be suitable for receiving a pipe that can be fixed to the mouth, e.g. by welding.

The material from which the insert is made is preferably selected to be compatible with that constituting the pipe, so as to enable the pipe to be welded to the insert and form a continuous junction that eliminates any risk of hydrocarbon emission.

In a variant, the insert can have a thread for receiving a separate element such as a cap, which can be put into place by being screwed onto the mouth.

The present invention also provides an insert for use in implementing the above-described method.

The present invention also provides a fuel tank vessel comprising a tubular insert for constituting an external mouth suitable for putting the inside of the vessel into communication with the outside, the vessel comprising at least a first layer forming a hydrocarbon barrier and a second layer that is more permeable to hydrocarbons than the first and that is on the outside of the first layer, and wherein the insert is shaped so as to lengthen the diffusion path for hydrocarbons diffusing along the second layer from the edge of the vessel adjacent to the insert towards the outside of the vessel, and/or to form reductions in thickness in said second layer along the diffusion path.

BRIEF DESCRIPTION OF THE DRAWINGS

In order to make the invention more understandable, there follows a description of implementations given as non-limiting examples with reference to the accompanying drawings, in which:

FIG. 1 is a partially cutaway elevation view of a fuel tank in accordance with the invention;

FIG. 2 is a close-up view in section of the mouthpiece of the tank fitted with a pipe;

FIG. 3 is a section view of an insert used for making the vessel of FIGS. 1 and 2;

FIG. 4 is an elevation view of the FIG. 3 insert; and

MORE DETAILED DESCRIPTION

Figure 5:
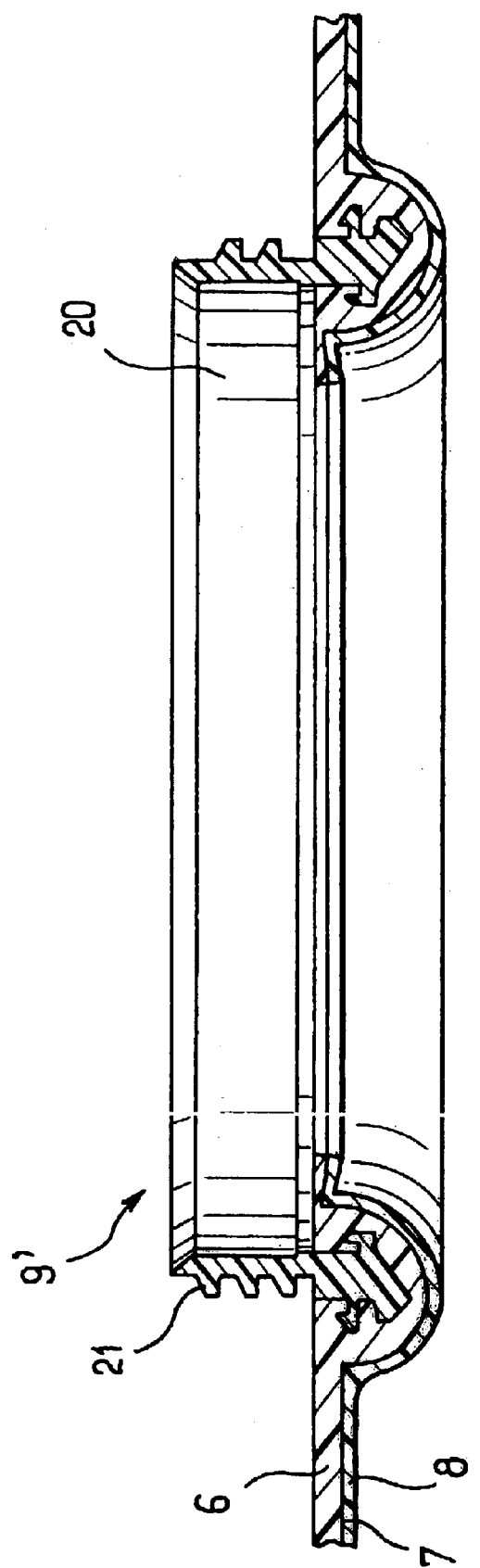
FIG. 5 is a fragmentary diagrammatic view in section of a tank constituting a variant embodiment of the invention.

The vessel 1 shown in FIG. 1 is a fuel tank which can be of various shapes, including a rectangular parallelepiped as shown.

The vessel 1 has various connections with pipes used for filling the tank, for supplying fuel to the engine, for returning fuel from the engine, for degassing, and for other specific functions associated with the tank.

In the example shown, only one pipe 2 is shown which can be seen in FIG. 2, which pipe is welded via its support disk 3 to the mouth 4 of a passage 5 putting the inside of the vessel into communication with the outside of the vessel.

The pipe 2 and its support disk are made of a low permeability material which constitutes an effective barrier to hydrocarbons.

The wall of the vessel is made as a sandwich. From the outside going towards the inside, it comprises an outer layer of polyethylene 6, an intermediate layer 7 of EVOH having very low permeability to hydrocarbons, and an inner layer 8 of polyethylene.

Between each of the polyethylene layers 6 and 8 and the barrier layer 7, there is interposed an adhesive layer (not shown) providing adhesion between polyethylene and EVOH.

The EVOH layer 7 is held captive between the two polyethylene layers 6 and 8 when making the parison which is to be transformed into the vessel of FIG. 1 by blowing.

To obtain the passage shown in FIGS. 1 and 2, the insert 9 as shown in FIGS. 3 and 4 is placed in the blow mold (not shown).

This insert 9 is in the form of a continuous portion of tube provided at the edges of one of its ends 10 with annular projections formed on its inner and outer walls 11 and 12.

Said projections are shaped in such a manner as to constitute:

an outer first annular groove 13 whose opening faces towards the outside of the insert;

an outer second annular groove 14 whose opening faces along the axis of the insert towards the outside of the vessel; and an inner third annular groove 15 whose opening faces along the axis of the insert towards the outside of the vessel.

In the present invention, the term "tubular shape" is used to mean any shape suitable for conveying a fluid that flows substantially along its axis.

Thus, the insert of tubular shape can present a flow section not only of circular shape as in the example described, but also of any other shape, e.g. elliptical, square, rectangular, etc.

Once the insert 9 is in place in the blow mold with its end 10 facing towards the inside of the mold, the parison can be pressed thereagainst and deform so as to cover said end 10 and its inner and outer faces 11 and 12, thereby filling the annular grooves 13, 14, and 15.

The deformed parison takes up the configuration shown in FIG. 2, where it can be seen that the outer layer 6 of polyethylene fills the grooves 13, 14, and 15 formed on the insert, and that the barrier layer 7 stretches so as to extend around the end of the insert, coming locally close to its projections.

Nevertheless, the barrier layer 7 remains held captive between the two layers of polyethylene.

It will be observed that the portion of the vessel situated in the space inside the insert presents a reentrant corner 18 due to the parison penetrating into the groove 15.

Because of its grooves 13, 14, and 15, the insert is securely anchored in the outer layer 6 of polyethylene, thus securing it to the vessel.

As can be seen in FIG. 3, a layer 16 of adhesive covers the end face of the insert facing towards the parison, thereby ensuring adhesion between the insert and the parison and enhancing the mechanical effect produced by the projections of the insert.

Thereafter, an opening is made in the portion of the vessel lying inside the insert, merely by cutting it open.

The end of the insert that faces towards the outside of the mold during blowing remains outside the vessel and is available to receive the support disk 3 of the pipe 2.

Since the insert 9 is made of a low permeability material that is identical or compatible with the material of the disk, there is no difficulty in welding the disk onto the insert.

It can be seen that the invention provides a vessel provided with a passage between its inside and its outside without deteriorating the wall of the vessel.

This passage has a mouthpiece constituted by the insert and its mouth is situated on the outside of the vessel where it can be welded to the pipe or to its support disk so as to ensure that the anti-emission barrier is continuous.

The only path available for hydrocarbons between the inside and the outside of the vessel 1 is via the outer layer 6 of polyethylene where it covers the insert 9.

This path is long and sinuous. It has three constrictions 17 due to the fact that the barrier layer is brought locally close to the projections of the insert, thereby considerably limiting hydrocarbon leakage to the outside.

Naturally, the embodiment described above is not limiting in any way and could be modified in any desirable manner without thereby going beyond the ambit of the invention.

In particular, FIG. 5 shows part of a tank analogous to that described above and differing therefrom only in the shape of the insert 9'.

In addition to grooves 13 to 15 analogous to those of the insert 9, this insert has an annular neck 20 extending outside the tank.

The neck 20 carries a thread 21 on its outside wall making it possible in this example to screw on a cap (not shown in FIG. 5).

The cap is unscrewed to purge the tank.

What is claimed is:

1. A fuel tank comprising:
   a vessel comprising a wall, said wall further comprising at least:
      a first layer forming a hydrocarbon barrier; and
      a second layer that is more permeable to hydrocarbons than the first layer and that is located on an outside of the first layer,
   an insert defining a passage between an inside of the vessel and an outside thereof, said insert having:
      a first end overmolded by said wall; and
      a second end opposite to said first end projecting outside the vessel, the wall having a portion extending inside the insert around an opening of said wall, the insert being configured to form at least one region of reduced thickness in said second layer along a diffusion path for hydrocarbons diffusing along the second layer from an edge of the wall adjacent to the opening towards the outside of the vessel.

2. The fuel tank according to claim 1, wherein the barrier-forming first layer further comprises a layer of EVOH.

3. The fuel tank according to claim 1, wherein the first layer is disposed between two other layers.

4. The fuel tank according to claim 1, wherein the vessel further comprises at least one layer made of polyethylene.

5. The fuel tank according to claim 1, wherein said insert is made of a material that is poorly permeable to hydrocarbons.

6. The fuel tank according to claim 1, wherein an adhesive is interposed between the wall and the first end of the insert.

7. The fuel tank according to claim 1, wherein at least one peripheral groove is provided on the first end of the insert, the wall penetrating into said at least one groove.

8. The fuel tank according to claim 7, wherein the at least one peripheral groove defines an inner groove opening out into the inside of the insert.

9. The fuel tank according to claim 8, said insert having an axis, wherein the insert further comprises an outer first groove whose opening faces towards the outside of the insert, an outer second groove whose opening faces along the axis of the insert towards the outside of the vessel, and an inner third groove whose opening faces along the axis of the insert towards the outside of the vessel.

10. The fuel tank according to claim 1, wherein the wall has a reentrant corner situated in the inside of the insert.

11. The fuel tank according to claim 1, wherein the insert forms an outside mouth suitable for receiving a pipe.

12. The fuel tank according to claim 1, wherein the insert includes a thread for receiving a separate element.

13. The fuel tank according to claim 12, wherein said separate element is a cap.

14. The fuel tank according to claim 1, wherein the second layer further comprises at least two regions of reduced thickness.

15. The fuel tank according to claim 14, wherein the second layer further comprises three regions of reduced thickness.

16. The fuel tank according to claim 1, wherein the fuel tank is a motor vehicle fuel tank.

17. A fuel tank comprising:
   a vessel comprising a wall, said wall further comprising at least:
      a first layer forming a hydrocarbon barrier; and
      a second layer that is more permeable to hydrocarbons than the first layer and that is located on an outside of the first layer,
   an insert defining a passage between an inside of the vessel and an outside thereof, said insert having:
      a first end overmolded by said wall; and
      a second end opposite to said first end projecting outside the vessel, the wall having a portion extending inside the insert around an opening of said wall, the insert being configured to lengthen a diffusion path for hydrocarbons diffusing along the second layer from an edge of the wall adjacent to the opening towards the outside of the vessel.

18. The fuel tank according to claim 17, wherein the barrier-forming first layer further comprises by a layer of EVOH.

19. The fuel tank according to claim 17, wherein the first layer is disposed between two other layers.

20. The fuel tank according to claim 17, wherein the vessel further comprises at least one layer made of polyethylene.

21. The fuel tank according to claim 17, wherein said insert is made of a material that is poorly permeable to hydrocarbons.

22. The fuel tank according to claim 17, wherein an adhesive is interposed between the wall and the first end of the insert.

23. The fuel tank according to claim 17, wherein at least one peripheral groove is provided on the first end of the insert, the wall penetrating into said at least one groove.

24. The fuel tank according to claim 23, wherein the at least one peripheral groove defines an inner groove opening out into the inside of the insert.

25. The fuel tank according to claim 17, said insert having an axis, wherein the insert further comprises an outer first groove whose opening faces towards the outside of the insert, an outer second groove whose opening faces along the axis of the insert towards the outside of the vessel, and an inner third groove whose opening faces along the axis of the insert towards the outside of the vessel.

26. The fuel tank according to claim 17, wherein the wall further comprises a reentrant corner situated in the inside space of the insert.

27. The fuel tank according to claim 17, wherein the insert forms an outside mouth suitable for receiving a pipe.

28. The fuel tank according to claim 17, wherein the insert includes a thread for receiving a separate element.

29. The fuel tank according to claim 28, wherein said separate element is a cap.

30. The fuel tank according to claim 17, wherein the fuel tank is a motor vehicle fuel tank.

\* \* \* \* \*